United States Patent [19]

Brinkmann et al.

[11] 3,929,188

[45] Dec. 30, 1975

[54] HEAT EXCHANGER INSTALLATION FOR A CLOSED GAS CIRCULATORY SYSTEM, SUCH AS A THERMAL POWER PLANT, FOR EXAMPLE

[75] Inventors: Dieter Brinkmann, Erlangen; Wolfgang Simon, Kersbach; Heinrich Zimon, Hemhofen, all of Germany

[73] Assignee: Kraftwerke Union Aktiengesellschaft, Mulheim (Ruhr), Germany

[22] Filed: June 3, 1974

[21] Appl. No.: 475,837

[30] Foreign Application Priority Data
June 5, 1973 Germany............................ 2328556

[52] U.S. Cl. ................... 165/66; 165/74; 165/107; 176/60; 176/65
[51] Int. Cl. ............................................. A23c 3/02
[58] Field of Search .......... 165/66, 74, 107; 176/60, 176/65

[56] References Cited
UNITED STATES PATENTS

| 3,470,066 | 9/1969 | Liusey et al. ..................... 176/65 X |
| 3,666,623 | 5/1972 | Harand et al. ..................... 176/65 X |

*Primary Examiner*—Charles Sukalo
*Attorney, Agent, or Firm*—Herbert L. Lerner

[57] ABSTRACT

A closed helium gas circulatory system includes a compressor, nuclear reactor, turbine, and heat exchanger installation serving as recuperator and precooler, the recuperative heat exchanger and the pre-cooling heat exchanger of the installation both having tubes, the tubes of one of the heat exchangers being disposed concentrically or coaxially to those of the other heat exchanger.

5 Claims, 3 Drawing Figures

HEAT EXCHANGER INSTALLATION FOR A CLOSED GAS CIRCULATORY SYSTEM, SUCH AS A THERMAL POWER PLANT, FOR EXAMPLE

The invention relates to a heat exchanging installation for a closed gas circulatory system, such as a thermal power plant, for example.

Closed gas circulatory systems are employable especially for transforming the heat generated by gas-cooled nuclear reactors into mechanical energy. In such systems, the reactor-cooling gas is conducted, after the heating thereof, to a gas turbine to perform work and to generate electrical energy.

The noble gas helium is particularly suited for such a gas circulatory system. To avoid gas losses, such a gas circulatory system is kept closed. Thus, the hot waste gas flowing out of the gas turbine is delivered to a first heat exchanger, also referred to as a recuperator or recuperative heat exchanger, for utilizing the waste heat thereof, the tubes of the first heat exchanger, which take up or absorb the waste heat, being directly connected to the nuclear reactor upstream thereof. This first heat exchanger thus utilizes the heat contained in the turbine waste gas for preheating the gas flow that is to be heated in the reactor. A second heat exchanger is connected to the gas-preheating first heat exchanger, downstream thereof, the second heat exchanger serving to cool the gas before it is admitted to a compressor and thereby removing heat from the circulatory system. The heat-exchanging tubes are traversed, for example, by coolant water. The gas which is accordingly cooled is then compressed, is preheated in the first or preheating heat exchanger and then returned to the reactor.

It is an object of the invention of this application to provide a heat exchanger installation which includes heat exchangers, respectively, for gas-preheating and for heat removal from the circulatory system that are mutually serially connected on the gas side thereof, which, on the one hand, are relatively easily accessible for assembly, inspection and repair thereof and, on the other hand, nevertheless have relatively short connecting lines.

It is a further object of the invention to provide such a heat exchanger installation that can be installed or assembled in relatively small cylindrical prestressed concrete vessels that are connectible directly to a prestressed concrete containment vessel for the nuclear reactor.

With the foregoing and other objects in view, there is provided, in accordance with the invention, a heat exchanger installation assemblable in a closed gas circulatory system which includes a heat consumer and a heat source located upstream of the heat consumer in flow direction of gas in the circulatory system, comprising a recuperative heat exchanger, a precooling heat exchanger, and means for conducting gas, that has been cooled in the heat consumer, through the recuperative heat exchanger for preheating the gas to the precooling heat exchanger for removing heat from the circulatory system, the precooling heat exchanger for removing heat from the circulatory system being connected to the heat source through a compressor and through the recuperative heat exchanger for preheating the gas, one of the heat exchangers having tubes disposed around a centrally located space, and the other of the heat exchangers having tubes projecting into the centrally located space, supply and discharge lines for heat exchanging working medium traversing the tubes of the heat exchangers being located at one end of each of the heat exchangers, a supply inlet for heated waste gas delivered from the heat source and a gas discharge outlet both being located at the other ends, respectively, of the recuperative heat exchanger for preheating the gas and of the precooling heat exchanger for removing heat from the circulatory system, and flow-through opening means for the gas located between the centrally located space and the space surrounding the same at the other ends of the heat exchanger at which the waste gas supply inlet and gas discharge outlet are located.

Although the invention is illustrated and described herein as embodied in heat exchanger installation for a closed gas circulatory system, such as a thermal power plant, for example, it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
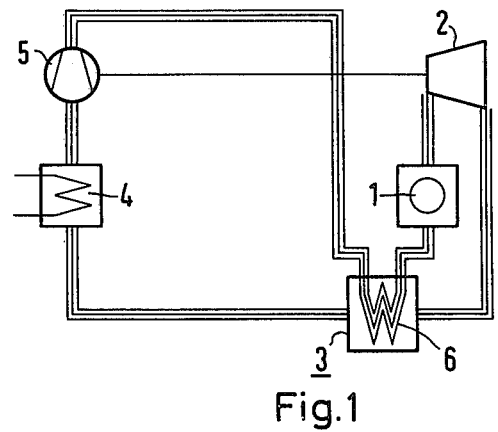
FIG. 1 is a circuit diagram of a closed gas circulatory system provided with a nuclear reactor as heat source, as gas turbine as heat consumer, and a water-cooled heat exchanger as heat sink for removing heat from the circulatory system.

Referring now to the drawing and, first, particularly to FIG. 1 thereof, there is shown schematically the closed gas circulatory system of the invention wherein a gas turbine 2 is connected to a nuclear reactor 1 at a location downstream therefrom. Gas discharging from the gas turbine 2 passes through a heat exchanger 3 serving as a gas preheater, continues therefrom into a heat exchanger 4 wherein heat is removed from the gas and from the circulatory system, and from there, the gas is conducted into a compressor 5 mounted on the rotary shaft of the gas turbine 2. The pressure or delivery side of the compressor 5 is connected to the nuclear reactor 1 through coils 6 located in the heat exchanger 3 wherein the gas is preheated by the hot gas discharging from the gas turbine 2.

Figure 3:
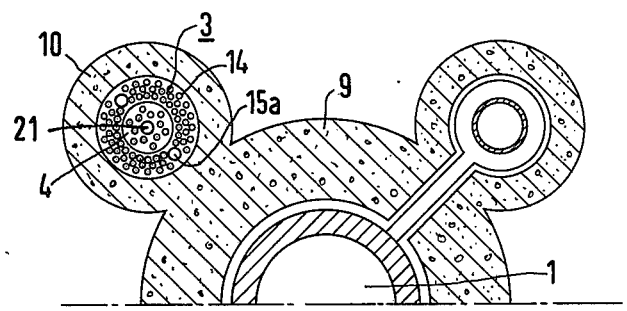
FIG. 3 is a cross-sectional view taken along the line III-III in FIG. 2.
Figure 2:
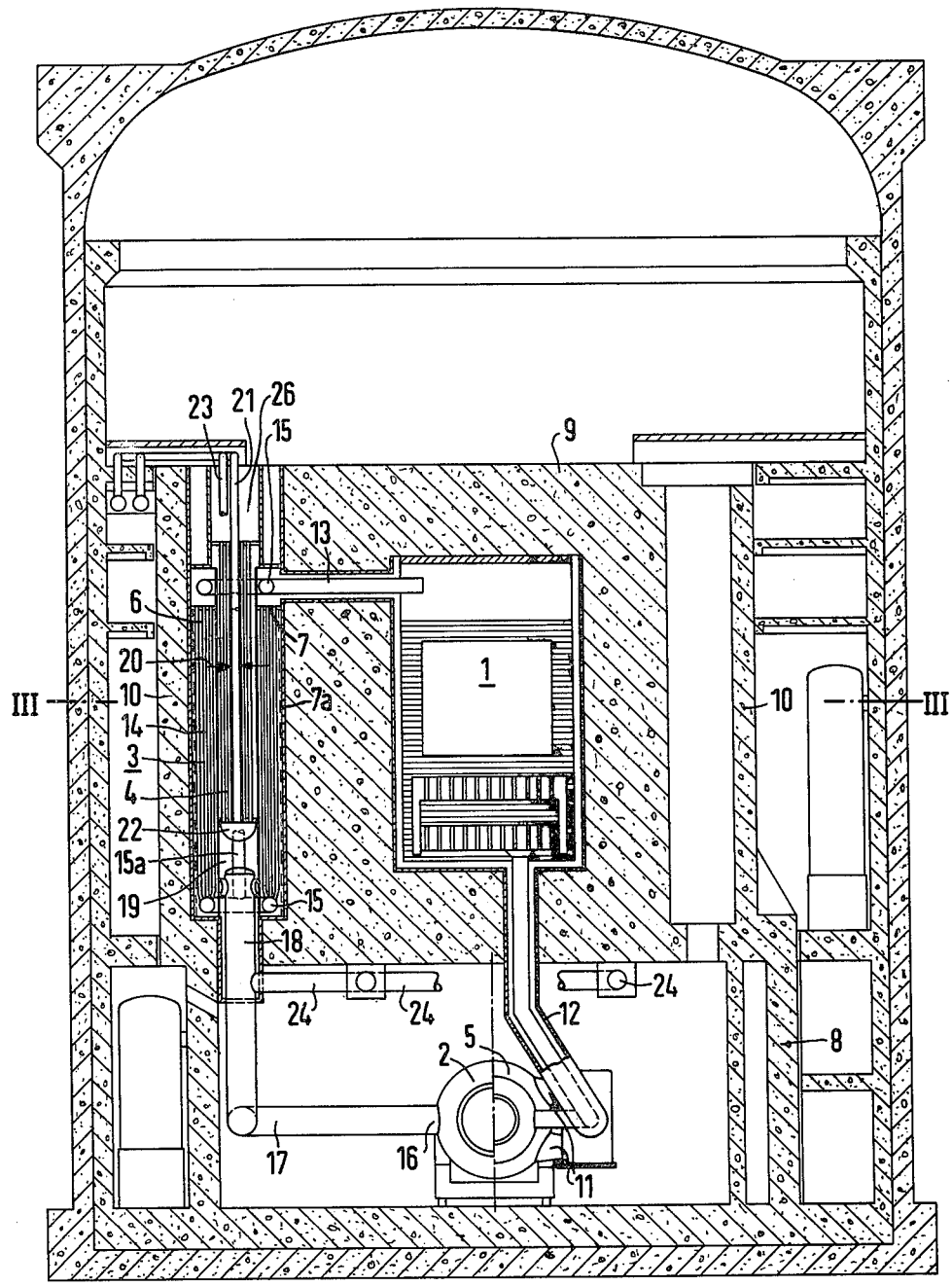
FIG. 2 is a vertical sectional view of an actual embodiment of the circulatory system shown schematically in FIG. 1.

An actual or physical embodiment of the components of the closed gas circulatory system for a thermal power plant employing the heat exchanger installation according to the invention is shown in FIGS. 2 and 3. The gas turbine 2 and the compressor 5, both having rotating members mounted on a common shaft, are assembled together with a generator for producing electrical energy in a turbine safety chamber 8. A prestressed concrete containment vessel 9, wherein a nuclear reactor 1 is received, is located above the turbine safety chamber 8 and is provided with smaller cylindrical outer vessels 10 that are connected in a star-like distribution circumferential thereto as shown more clearly in FIG. 3. The outer vessels 10, at least partly contain the heat exchanger installation according to the invention, which is made up of the heat exchanger 3 for preheating the gas, and the heat exchanger 4 for removing heat from the circulatory system.

The gas compressed in the compressor 5 is delivered, at the radially outer region of the compressor 5, to a plurality of pipe unions 11 that are provided for connection with a coaxial pipe 12 i.e. a pipe formed of a pair of telescoping tubes, and is further conducted through the pipe 12 to the nuclear reactor 1 located thereabove as shown in FIG. 2. In the reactor 1, the gas flows upwardly along the reactor walls and accordingly absorbs waste heat from the reactor 1, thereby contributing to the thermal insulation of the prestressed concrete container 9. The gas then passes through the radially outer annular passageway of another coaxial tube 13 from the prestressed concrete container 9 into one of the outer cylindrical vessels or containers 10, and then flows through a multiplicity of tubes 14 of the heat exchanger 3 for preheating gas, that are concentrically distributed around a space wherein the heat exchanger 4 for removing heat from the circulatory system is received, the tubes 14 being retained in position by a tube plate 7. The latter is seated on an insert 7a that has been introduced into the outer cylindrical vessel 10 so that the tubes 14 can expand freely in downward direction and can be withdrawn with the tube plate 7 in upward direction. After the gas has passed through the tubes 14, it reaches collecting pipes or manifolds 15, that are connected by connecting tubes 15a one to another in the vicinity of the heat-exchanging tubes 14, and then flows through the inner region of the coaxial tube 13 into the interior of the reactor 1. Within the reactor 1, the gas serves for cooling the fuel elements therein, is heated accordingly to the operating temperature, and flows through the interior of the coaxial tube 12 and the gas-pipe unions 11 into the gas turbine 2. The gas discharges from the gas turbine 2 through gas-pipe unions 16 and travels through distributor tubes 17 into the interior of coaxial tubes 18, of which four are provided in the illustrated embodiment of FIG. 2, in accordance with the number of heat exchanger devices appertaining thereto. The tubes of the heat exchanger 4 for removing heat from the circulatory system are somewhat shorter than those of the heat exchanger 3 for gas preheating. Consequently, there is formed in the central space surrounded or enclosed by the heat exchanger 3 for gas preheating, a free region 19 which serves for distributing the waste gas that flows upwardly in the interior of the coaxial tube 18 out of the gas turbine 2.

Between the tubes of the heat exchanger 3 for gas preheating, the gas flows vertically upwardly and then enters in direction of the arrow 20, at the upper end of the heat exchanger device, into the interior central space, into which there project the tubes of the heat exchanger for heat removal from the circulatory system. These tubes are supplied with coolant water through a coolant water supply line 21. The coolant water is collected in a hemispherical water chamber 22 and leaves the heat exchanger 4 through a water discharge tube 23. The consequently cooled-off gas flows into the outer region of the coaxial tube 18 and therefrom out through manifolds or collecting pipes 24 to the compressor 5.

A result of this construction is that no connecting lines are required between the heat exchangers for gas-preheating and for removing heat from the circulatory system. The tubes of the heat exchanger 4 for removing heat from the circulatory system are held only at the upper ends thereof in a closure plug or stopper 26 and can therefore be withdrawn upwardly out of the outer vessel 10. In addition, the tubes of the heat exchanger 4 for gas preheating are removable in a similar manner.

The heat exchanger installation of the invention permit, through the use of coaxial gas-conducting tubes, the flow, respectively, of hot gas in the interior thereof and cold gas at the outside thereof, so that the thermal insulation of the surrounding vessel is facilitated. The wall of the turbine safety chamber 8 serves simultaneously for bracing the prestressed concrete containment vessel 9. The entire gas circulatory system is thereby protected by concrete walls.

There is claimed:

1. Heat exchanger installation for assembly in a closed gas circulatory system which includes a heat consumer and a heat source located upstream of said heat consumer in flow direction of gas in said circulatory system, comprising a recuperative heat exchanger, a precooling heat exchanger, and means for conducting gas, that has been cooled in the heat consumer, through said recuperative heat exchanger for preheating the gas to said precooling heat exchanger for removing heat from the circulatory system, said precooling heat exchanger for removing heat from the circulatory system being connected to the heat source through a compressor and through said recuperative heat exchanger for preheating the gas, one of said heat exchangers having tubes disposed around a centrally located space, and the other of said heat exchangers having tubes projecting into said centrally located space, supply and discharge lines for heat exchanging working medium traversing the tubes of said heat exchangers being located at one end of each of said heat exchangers, a supply inlet for heated waste gas delivered from the heat source and a gas discharge outlet both being located at the other ends, respectively, of said recuperative heat exchanger for preheating the gas and of said precooling heat exchanger for removing heat from the circulatory system, and flowthrough opening means for the gas located between said centrally located space and the space surrounding the same at said other ends of said heat exchangers at which said waste gas supply inlet and said gas discharge outlet are located.

2. Heat exchanger installation according to claim 1 wherein the tubes of said precooling heat exchanger for removing heat from the circulatory system project into said centrally located space, and the tubes of said recuperative heat exchanger for preheating the gas are disposed in a space surrounding said centrally located spaced, said tubes of said precooling heat exchanger being shorter than those of said recuperative heat exchanger so as to form a free region surrounded by the tubes of said recuperative heat exchanger, and including distributor tubes for waste gas flowing out of the heat consumer, said distributor tubes being located in said free region.

3. Heat exchanger installation according to claim 1 wherein at least the tubes of the heat exchanger projecting into said centrally located space are suspended at only one end thereof within the installation.

4. Heat exchanger installation according to claim 3 including a closure plug located at an upper end of said centrally located space and holding said last-mentioned tubes within said centrally located space.

5. Heat exchanger installation according to claim 4 including a substantially cylindrical vessel wherein said heat exchangers are received, said closure plug, from which the tubes of said precooling heat exchanger are suspended in the centrally located space, projecting into said substantially cylindrical vessel, and including an insert fitted in said cylindrical vessel and carrying a tube plate, the tubes of said recuperative heat exchanger surrounding said centrally located space being secured to said tube plate.

* * * * *